Figure 1:
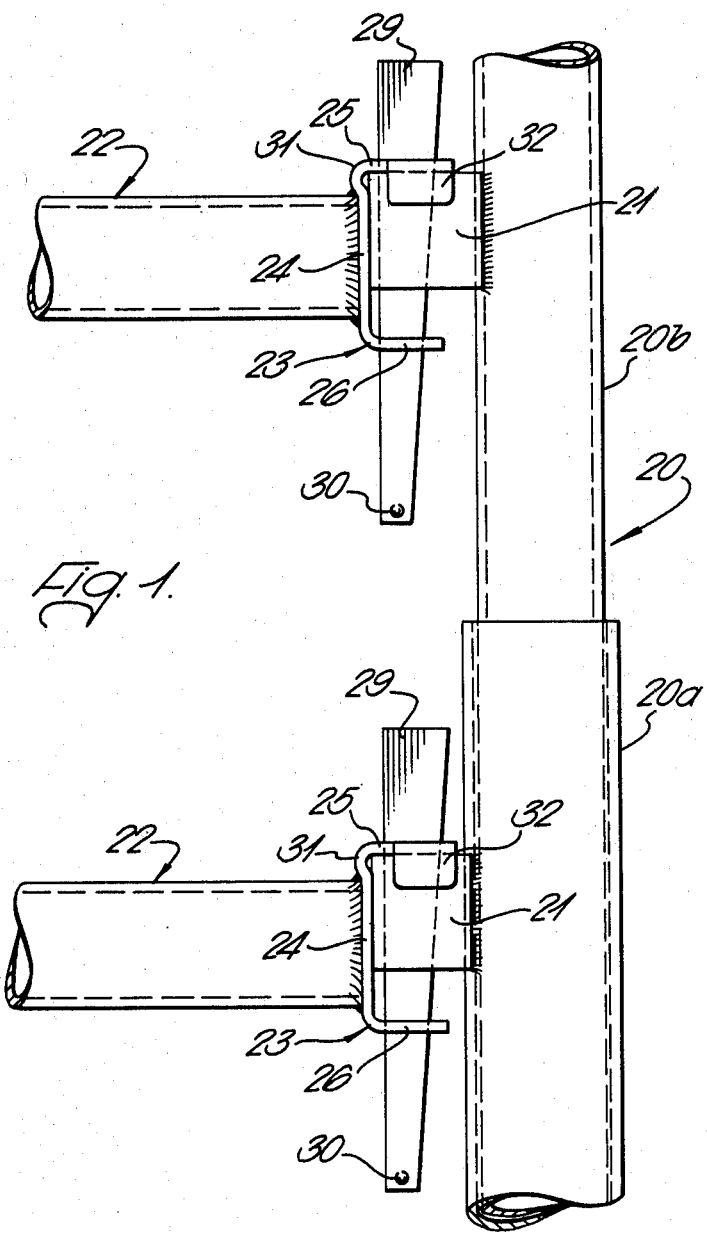

United States Patent [19]

Gostling

[11] 4,348,128

[45] Sep. 7, 1982

[54] CONNECTOR ASSEMBLY FOR SCAFFOLD STRUCTURES

[75] Inventor: Peter E. Gostling, Sutton Coldfield, England

[73] Assignee: C. Evans & Sons Limited, Essex, England

[21] Appl. No.: 126,707

[22] Filed: Mar. 3, 1980

[30] Foreign Application Priority Data

Mar. 8, 1979 [GB] United Kingdom ............... 7908234
Sep. 12, 1979 [GB] United Kingdom ............... 791622

[51] Int. Cl.³ .......................... E04G 7/00; F16B 1/00
[52] U.S. Cl. ................................. 403/49; 403/409; 403/189; 403/374
[58] Field of Search ............... 403/49, 409, 189, 234, 403/237, 374

[56] References Cited

U.S. PATENT DOCUMENTS

3,880,533 4/1975 Gostling ............................... 403/49

FOREIGN PATENT DOCUMENTS

1180562 2/1970 United Kingdom ............... 403/49
1408566 10/1975 United Kingdom ............... 403/49
1494320 12/1977 United Kingdom ............... 403/49
1528961 10/1978 United Kingdom .

Primary Examiner—Wayne L. Shedd
Attorney, Agent, or Firm—Brumbaugh, Graves, Donohue & Raymond

[57] ABSTRACT

A connector assembly for a scaffold structure having an upright member or standard and a cross member, comprising an open-ended V or channel-shaped socket fixed to the upright member and a channel-shaped connector member fixed to an end of the cross member. In the fully assembled position, a base flange of the connector member is held, by means of a wedge element, in tight engagement with the outer surface of the socket and arms extending outwardly from the base flange, and over opposite ends of the socket, are such as to be spaced from the outer peripheral surface of the upright member. For location purposes, the free end of the uppermost arm of the connector member is formed with a downwardly depending tongue, or alternatively, the side edges of the uppermost arm are provided with downwardly depending flanges.

8 Claims, 11 Drawing Figures

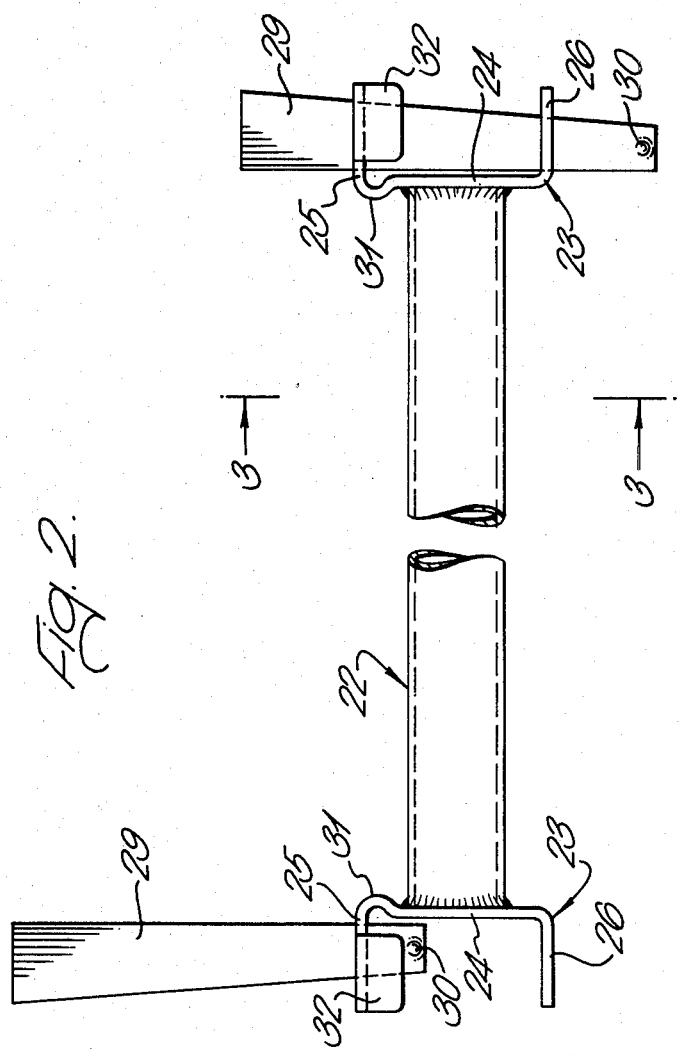

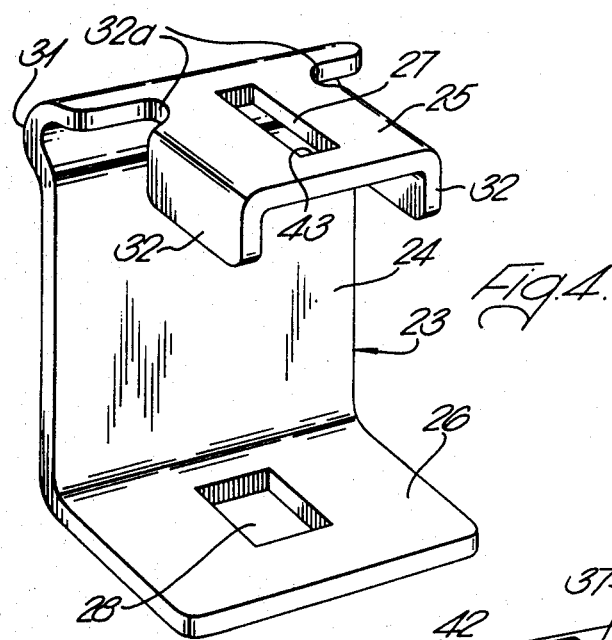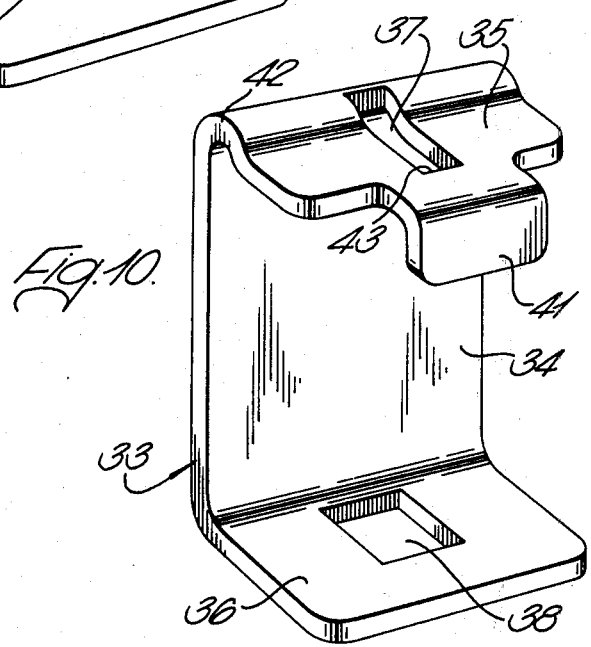

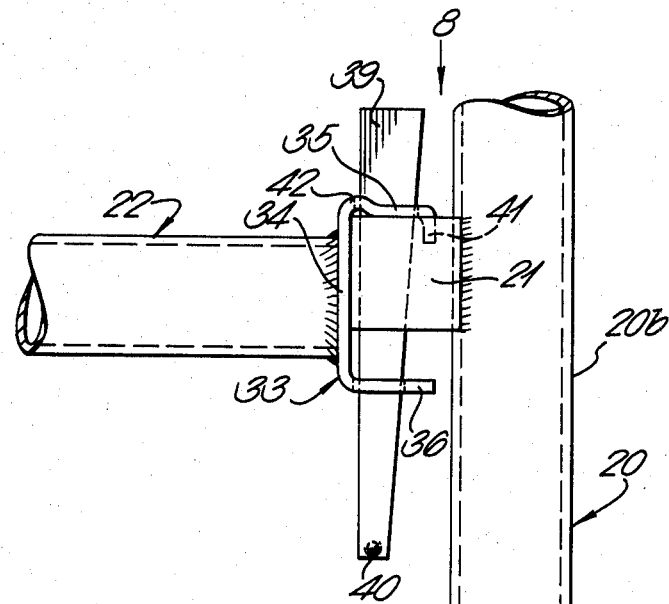
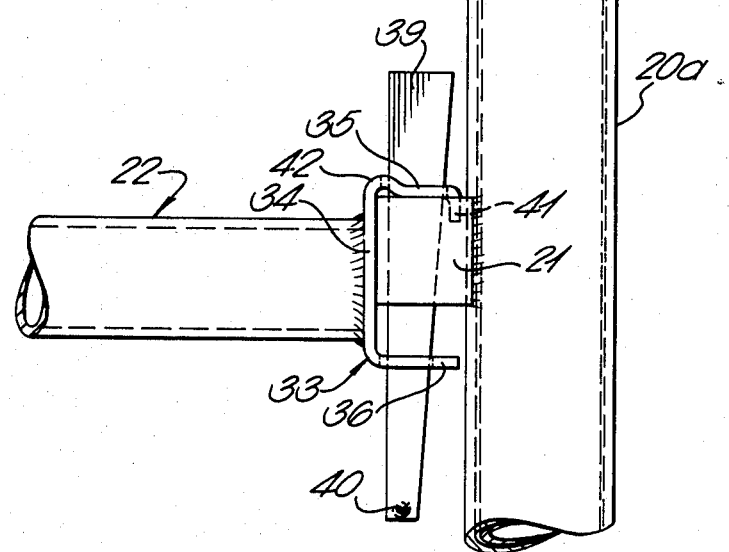
Fig. 5.

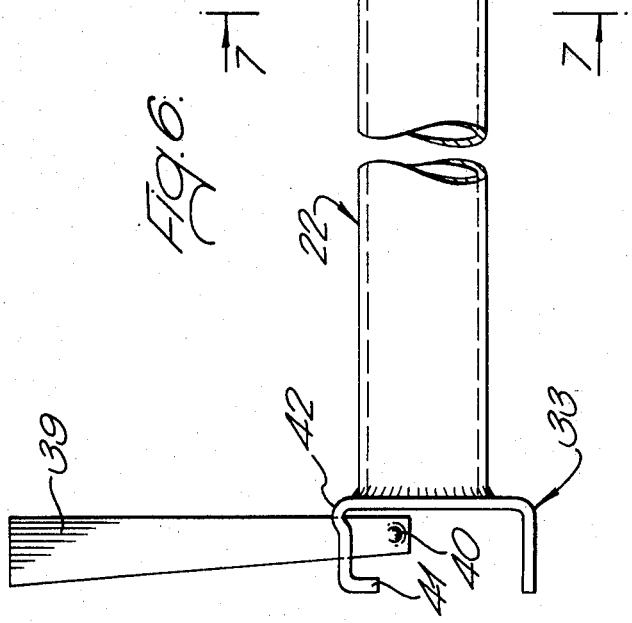

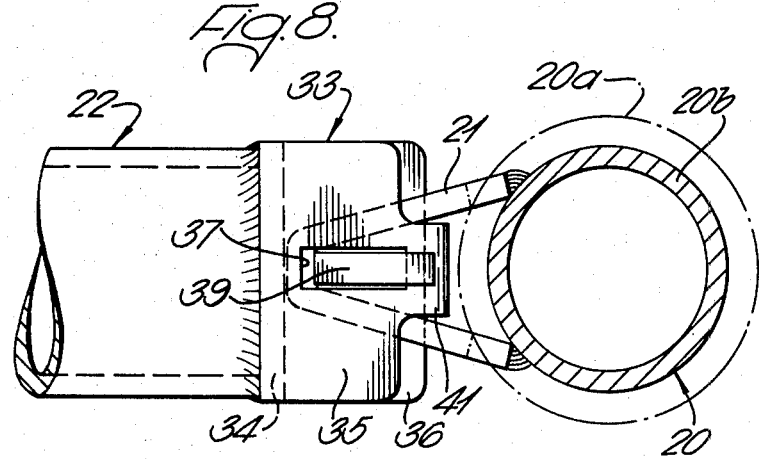
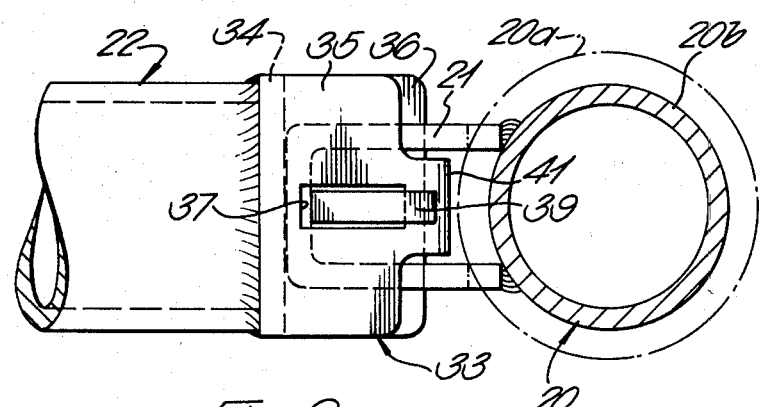

CONNECTOR ASSEMBLY FOR SCAFFOLD STRUCTURES

This invention relates to builders scaffolding for access and propping purposes, and of the kind comprising upright supports or standards and cross members which are interconnected to form a rigid structure. The term "cross members" includes horizontally extending ledgers, horizontally extending transoms, diagonal and other bracing lly with the connection between the upright supports or standards and the cross members in scaffolding of the aforementioned kind.

One known type of scaffold structure of the aforementioned kind comprises upright supports or standards having vertically spaced open-ended sockets of V-shaped formation, and cross members each having, at least at one end thereof, a channel-shaped connector member including a wedge element which, in the assembled and connected position, extends through the arms of the connector member, and through the socket, to provide a rigid connection between an upright support and a cross member. In this type of structure, in order to provide rigidity between the upright support and the cross member, the arrangement is such that the ends of the arms of the connector member are forced into engagement with the outer peripheral surface of the upright member.

In scaffold structures of the aforementioned kind, it is frequently necessary to make provision to use upright members of different diameters whilst maintaining a "standard" or predetermined distance between all the upright members of a structure. One example of the use of upright members of different diameters is disclosed in our U.S. Pat. No. 1,497,892 which describes and illustrates a puncheon unit.

A distinct disadvantage of the connector assembly of said known type of scaffold structure is that it cannot be used with upright members of different diameters. It is therefore among the objects of the present invention to provide a connector assembly of that type which can be used with upright members of different diameters.

According to the present invention, there is provided a connector assembly for use in builders scaffolding of the kind hereinbefore described, comprising an open-ended socket adapted to be fixed to an upright member or standard with the open ends thereof in parallel alignment with the axis of the upright member, a channel-shaped connector member adapted to be fixed to an end of a cross member and, in use, to be positioned with the arms thereof at opposite ends of the socket, and a wedge element provided to extend through openings in the arms of the connector member, and through the socket, wherein, in the fully interconnected position, the base flange of the connector member is in tight engagement with the outer surface of the socket and the ends of the arms of the connector member are in spaced relationship with the outer peripheral surface of the upright member.

Preferably, the socket is of V-shaped formation but it may be of channel-shaped formation.

Figure 11:
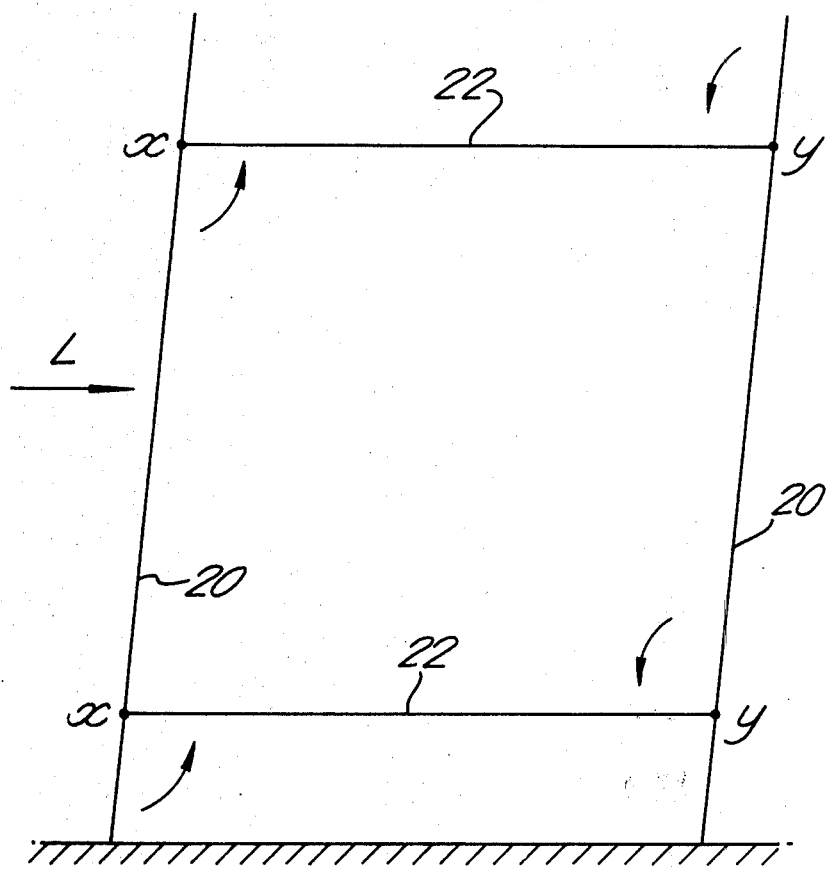

The invention is illustrated by way of example in the accompanying drawings in which, FIG. 1 is a side elevation showing, in use, two connector assemblies according to the invention with two different diameter upright members or standards, FIG. 2 is a side elevation of a cross member showing one connector member with its wedge element in an inoperative position and the other in an operative position, FIG. 3 is a section on the line 3—3 of FIG. 2, FIG. 4 is a perspective view of a connector member, FIG. 5 is a side elevation showing, in use, two modified connector assemblies according to the invention with two different diameter upright members or standards, FIG. 6 is a side elevation of a cross member showing one connector member with its wedge element in an inoperative position and the other in an operative position, FIG. 7 is a section on the line 7—7 of FIG. 6, FIG. 8 is a view, on an enlarged scale, in the direction of the arrow of FIG. 5 showing the use of V-shaped sockets, FIG. 9 is a view, on an enlarged scale, in the direction of the arrow 8 of FIG. 5 showing the use of channel-shaped sockets, FIG. 10 is a perspective view of a modified form of connector member, and FIG. 11 is a stress diagram.

Referring to FIGS. 1 to 4 of the drawings, there is shown an upright tubular member 20, which may be part of a puncheon unit, the member 20 having a first tube 20a of one diameter and a second tube 20b of smaller diameter than that of tube 20a. Each tube has fixed thereto, as by welding, an open-ended socket 21 of V-shaped formation, the open ends of the sockets 21 extending parallel with the longitudinal axis of the tubes.

Cross members 22 to be connected to the upright member 20 each have fixed thereto, as by welding, a connector member 23. Each connector member 23 comprises a channel-shaped element having a base flange 24, an upper arm 25 and a lower arm 26. The upper and lower arms 25 and 26 are provided respectively with co-acting openings 27 and 28 which have received therein a plate-like wedge element 29. The wedge element 29 is held captive in the connector member 23 by virtue of the fact that the widest end of the wedge is wider than the length of the opening 27, and by providing the narrowest end of the wedge with a projection 30 which prevents the wedge from being withdrawn through the opening 27. In this respect, as can be seen from the drawings, the opening 28 is of greater width than that of the opening 27 to permit the wedge to be withdrawn therethrough for the purpose of positioning the connector member 23 over the socket 21.

In use, the wedge 29 is moved into an inoperative position where it is withdrawn from the opening 28 in the lower arm 26 as is shown on the lefthand side of FIG. 2. The connector member 23 is then positioned over the socket 21 with the upper arm 25 thereof resting on the uppermost end of the socket 21. In this position, the wedge 29 is passed through the socket 21 and the opening 28 of the arm 26 and is hammered downwards so that the wedge, which is positioned between the inner surface of the socket 21 and the leading edges of the openings 27 and 28, draws the base flange 24 into tight engagement with the outer surface of the socket 21.

To ensure accurate face-to-face contact between the co-acting faces of the flange 24 and the socket 21, the uppermost portion of the base flange 24 is rearwardly radiused or deformed at 31 to avoid any interference between the outer top corner of the socket 21 and the inner top corner of the connector member 23.

To assist in locating the connector member 23 relative to the socket 21, the upper arm 25 of the member 23 has downwardly extending flanges 32 which, in the position of use, depend on opposite sides of the socket 21. The flanges 32 are spaced from the base flange 24 by virtue of cut-out portions indicated at 32a.

Although it is not essential, it would be expedient to provide the flanges 32 so that they are a close fit with the wall of the socket 21 with lead-in arcuate portions where necessary to facilitate assembly. In this respect, it will be appreciated that close fitting of the flanges 32 with the socket 21 will serve to increase the stability of the connection.

Although the invention has been specifically described with reference to the socket 21 as being of V-shaped formation the socket 21 could of course be of channel-shaped formation. Furthermore, although the wedge element 29 is shown as being in the form of flat plate, it would have a cross-section which corresponds, both in size and shape, to the internal peripheral shape of the socket 21.

In practice, the connecting assembly of the present invention is usable with upright members of different diameters because of the fact that ridigity is established without the ends of the arms 25 and 26 being in contact with the surface of the upright member. Thus, as can be seen from FIG. 1, in order that the lengths of the cross members 22 can remain constant irrespective of the diameter of the upright members, the distance from the central longitudinal axis of the upright member to the end of the sockets 21 is maintained constant by providing different sizes of socket according to the diameters of the upright members.

Referring now to FIGS. 5 to 10 of the drawings, there is shown a modified connector assembly. This assembly is basically the same as the assembly hereinbefore described with reference to FIGS. 1 to 4 of the drawings, the modification being in connection with the connector members 23 fixed to ends of the cross members 22.

The modified connector member is shown at 33 and comprises a generally channel-shaped element having a base flange 34 which is fixed, as by welding, to the end of the cross member 22, an upper arm 35 and a lower arm 36. The upper and lower arms 35 and 36 are provided respectively with co-acting openings 37 and 38 in which is received a plate-like wedge element 39. The wedge element 39 is held captive in the connector member 33. This is effected by making the widest end of the wedge wider than the length of the opening 37, thus restricting downward movement of the wedge, and by providing a projection 40 on the narrowest end of the wedge which is such that the narrow end will not pass through the opening 37 thereby limiting upward movement of the wedge. The opening 38 however is of greater width than that of the opening 37 and thus is such as to allow passage therethrough of the narrowest end of the wedge. This latter feature enables the wedge 39 to be withdrawn sufficiently to permit the connector member 33 to be positioned over, and removed from, the socket 21.

Furthermore, the upper arm 35 of the connector member 33 is formed, on its free edge, with a centrally disposed tongue 41 which is bent downwardly towards the lower arm 36.

In use, the wedge 39 is moved into an inoperative position where it is withdrawn from the opening 38 in the lower arm 36 as is shown on the lefthand side of FIG. 6. The connector member is then positioned over the socket 21 with the tongue 41 hooked over the uppermost end of the socket and the upper arm 35 is resting thereon. The lower arm 36 would then be positioned below the socket 21, and in spaced relationship therewith, the spacing having provided the necessary freedom to manipulate the connector member into the required position.

In this position, the wedge 39 is passed through the socket 21 and the opening 38 and is hammered downwards so that the wedge, which is positioned between the inner surface of the socket 21 and the leading edges of the openings 37 and 38, draws the base flange 34 into tight engagement with the outer surface of the spigot 21 with the tongue 41 securely positioned within the socket 21. As can be seen from FIGS. 8 and 9, which show respectively the use of a V-shaped socket 21 and a channel-shaped spigot 21, the length of the arms 35 and 36 are such that, irrespective of the diameter of the tubes 20a and 20b, the ends of the arms are out of contact with the tubes. In this respect, as shown in FIGS. 8 and 9, the sockets 21 used on the larger diameter tube (indicated in chain dot lines) are shorter than those used on the smaller diameter tube.

In order to ensure accurate face-to-face contact between the flange 34 and the outer surface of the socket 21, and between the upper arm 35 and the top surface of the socket 21, the innermost end of the upper arm 35 is upwardly radiused or deformed at 42. Thus, the radiused portion 42 avoids the presentation of a radiused corner as is shown between the flange 34 and the lower arm 36.

Compared with the embodiment of FIGS. 1 to 4, the embodiment of FIGS. 5 to 10 has been found to have the following advantages:

1. The provision of the tongue 41 presents a more positive location than the flanges 32 and, in addition, should the wedge become loosened, the hook-like action of the tongue will maintain a positive connection between the upright member 20 and the cross member 22.

2. Most scaffold connections, in order to reduce the amount of triangulation required, have a fair amount of rigidity. In this respect, referring to line diagram of FIG. 11, which shows the deflected form of an untriangulated scaffold structure under the action of a horizontal load L, there are anti-clockwise moments at Y which induce a tensile force in the upper arm 25 of the connector member 23 and this, in turn, through the wedge 29, produces a shearing force at the leading edge 43 of the opening 27 in the upper arm 25. Since the connector members 23 are made to cater for upright members of two different diameters, the amount of metal in the upper arm 25 is limited and could be insufficient to resist the shearing force at 43. This problem is avoided by the provision of the tongue 41.

What we claim is:

1. A connector assembly for use in builders scaffolding of the kind hereinbefore described, comprising an open-ended socket adapted to be fixed to an upright member or standard with the open ends thereof in parallel alignment with the longitudinal axis of the upright member, a channel-shaped connector member having a base flange and upper and lower arms and adapted to be fixed by its base flange to an end of a cross member and, in use, to be positioned with its arms at opposite ends of the socket, and a wedge element provided to extend through openings in the respective arms of the connector member, and through the socket wherein, in the fully interconnected position of the assembly, the base flange of the connector member is in tight engagement with the outer surface of the socket and the ends of the arms of the connector member are in spaced relationship with the outer peripheral surface of the upright member.

2. An assembly as claimed in claim 1, wherein the wedge element is a flat tapered plate and is held captive in the connector member.

3. An assembly as claimed in claim 2, wherein the narrowest end of the wedge element is provided with a transverse projection and is of a size to pass through the opening in the lower arm but not through the opening in the upper arm, and the widest end of the wedge element is wider than the length of the opening in the upper arm.

4. An assembly as claimed in any one of claims 1 to 3, wherein the upper arm of the connector member is formed, on two opposite side edges thereof, with downwardly extending flanges which, in the assembled position, co-act with the outer surface of the socket.

5. An assembly as claimed in any one of claims 1 to 3, wherein the free end of the upper arm of the connector member is formed with a downwardly depending tongue which, in the assembled position, extends into the socket and co-acts with the inner surface thereof.

6. An assembly as claimed in claim 1, wherein, at the juncture of the base flange and the upper arm of the connector member, the base flange or the upper arm is outwardly radiused or deformed to avoid interference between the outer top corner of the socket and the inner top corner of the connector member.

7. An assembly as claimed in claim 1, wherein the socket is of V-shaped formation.

8. An assembly as claimed in claim 1, wherein the socket is of channel-shaped formation.

* * * * *